(12) United States Patent
Ma et al.

(10) Patent No.: US 11,990,620 B2
(45) Date of Patent: May 21, 2024

(54) VANADIUM SODIUM PHOSPHATE POSITIVE ELECTRODE MATERIAL, SODIUM ION BATTERY, PREPARATION METHOD THEREFOR, AND USE THEREOF

(71) Applicant: SHANGHAI ZIJIAN CHEMICAL TECHNOLOGY CO., LTD, Shanghai (CN)

(72) Inventors: Zifeng Ma, Shanghai (CN); Haiying Che, Shanghai (CN); Xiaowei Yang, Shanghai (CN); Guijia Cui, Shanghai (CN)

(73) Assignee: SHANGHAI ZIJIAN CHEMICAL TECHNOLOGY CO., LTD, Shanghai (CN)

( * ) Notice: Subject to any disclaimer, the term of this patent is extended or adjusted under 35 U.S.C. 154(b) by 648 days.

(21) Appl. No.: 17/265,811

(22) PCT Filed: Aug. 7, 2019

(86) PCT No.: PCT/CN2019/099660
§ 371 (c)(1),
(2) Date: Feb. 4, 2021

(87) PCT Pub. No.: WO2020/030014
PCT Pub. Date: Feb. 13, 2020

(65) Prior Publication Data
US 2021/0167387 A1    Jun. 3, 2021

(30) Foreign Application Priority Data

Aug. 7, 2018 (CN) .......................... 201810889365.2
Mar. 18, 2019 (CN) .......................... 201910203315.9

(51) Int. Cl.
*H01M 4/58* (2010.01)
*C01B 25/45* (2006.01)
(Continued)

(52) U.S. Cl.
CPC ........... *H01M 4/5825* (2013.01); *C01B 25/45* (2013.01); *H01M 4/366* (2013.01); *H01M 4/381* (2013.01);
(Continued)

(58) Field of Classification Search
CPC .... H01M 4/5825; H01M 4/366; H01M 4/381; H01M 4/587; H01M 10/0436; H01M 10/054; C01B 25/45
(Continued)

(56) References Cited

FOREIGN PATENT DOCUMENTS

| CN | 102496716 A | 6/2012 |
| CN | 105336924 A | 2/2016 |

(Continued)

OTHER PUBLICATIONS

Nov. 3, 2021 the First Chinese Office Action issued in Chinese application No. 2018108893652.
(Continued)

*Primary Examiner* — James M Erwin
(74) *Attorney, Agent, or Firm* — Houston Beshining Law Office PLLC; Liangang Ye

(57) ABSTRACT

A vanadium sodium phosphate positive electrode material, a sodium ion battery, and a preparation method therefor and application thereof. The preparation method of the vanadium sodium phosphate positive electrode material comprises the following steps: (1) reacting an aqueous solution containing a vanadium source with a phosphorus source, a reducing agent, a sodium source, and a carbon source, the reaction comprising first performing a reaction of an aqueous solution of the vanadium source and the phosphorus source, and then perform a reaction with the reducing agent, or first performing a reaction of the aqueous solution of the vanadium source with the reducing agent and then performing a reaction with the phosphorus source; (2) drying and
(Continued)

calcining the reaction liquid obtained in step (1). The vanadium sodium phosphate positive electrode material has a high dispersibility, and has stable circulation performance when used in a battery.

20 Claims, 8 Drawing Sheets

(51) Int. Cl.
    *H01M 4/36*     (2006.01)
    *H01M 4/38*     (2006.01)
    *H01M 4/587*     (2010.01)
    *H01M 10/04*     (2006.01)
    *H01M 10/054*     (2010.01)
    *H01M 4/02*     (2006.01)

(52) U.S. Cl.
    CPC ....... *H01M 4/587* (2013.01); *H01M 10/0436* (2013.01); *H01M 10/054* (2013.01); *C01P 2002/52* (2013.01); *C01P 2002/72* (2013.01); *C01P 2004/03* (2013.01); *C01P 2004/04* (2013.01); *C01P 2004/24* (2013.01); *C01P 2004/80* (2013.01); *C01P 2006/40* (2013.01); *H01M 2004/021* (2013.01); *H01M 2004/028* (2013.01)

(58) Field of Classification Search
    USPC .................................................... 429/231.5
    See application file for complete search history.

(56) References Cited

FOREIGN PATENT DOCUMENTS

| | | | |
|---|---|---|---|
| CN | 105914352 | A | 8/2016 |
| CN | 107611367 | A * | 1/2018 |
| CN | 107819115 | A | 3/2018 |
| CN | 108134083 | A | 6/2018 |
| CN | 109775680 | A | 5/2019 |
| CN | 109904450 | A | 6/2019 |
| KR | 20180046419 | A | 5/2018 |

OTHER PUBLICATIONS

Huajun Zhou et al., Improving the cycling stability of Na3 V 2(PO4)3 nanoparticle in aqueous sodium ion batteries by introducing carbon support, Mater Renew Sustain Energy (2016) 5:3.

Jun. 30, 2021 the First Chinese Office Action issued in Chinese application No. 201910203315.9.

"Effect of Carbon Matrix Dimensions on the Electrochemical Properties of Na3V2(PO4)3 Nanograins for High Performance Symmetric Sodium-Ion Batteries", Shuo Li et. al., Adv. Mater vol. 26, p. 3545-3553.

Oct. 14, 2019 International Search Report issued in International Patent Application No. PCT/CN2019/099660.

Oct. 14, 2019 Written Opinion of the International Searching Authority issued in International Patent Application No. PCT/CN2019/099660.

DAI Changsong, Electrochimica Acta, 2013, 103:259-265.

CAO Jiali, "Study on Synthesis and Characteristics of Cathode Mterials for Sodium-ion Batterues," Chinese Master's Theses Full-text Database, Engineering Science & Technology II, No. 02, Feb. 15, pp. 20-23, 41-46, Feb. 15, 2018.

Apr. 6, 2022 Second Chinese Office Action issued in Chinese Patent Application No. 201810889365.2.

* cited by examiner

VANADIUM SODIUM PHOSPHATE POSITIVE ELECTRODE MATERIAL, SODIUM ION BATTERY, PREPARATION METHOD THEREFOR, AND USE THEREOF The present application is a National Stage of International Application No. PCT/CN2019/099660, filed on Aug. 7, 2019, which claims the priority of the Chinese Patent Application No. 2018108893652 filed on Aug. 7, 2018 and the Chinese Patent Application No. 2019102033159 filed on Mar. 18, 2019, the contents of which are incorporated herein by their entirety.

TECHNICAL FIELD

The present disclosure relates to a vanadium sodium phosphate positive electrode material, a sodium ion battery, and a preparation method therefor and a use thereof.

BACKGROUND ARTS

Large-scale energy storage represented by smart grid puts forward higher requirements for energy storage technology, and the development of secondary battery systems applied in the art of large-scale energy storage is urgently needed. Due to its special application scenarios, it must have the characteristics of sustainability, low cost, safety and reliability, and long life, while taking into account the requirements of electrochemical performance indicators such as energy density, power density, and rate performance. Therefore, the development of energy storage battery systems that can meet these requirements is a major technical challenge in the field of materials and energy. The widespread application of lithium ion batteries in life has led to an increasing demand for lithium, but its cost and source limit the large-scale application of lithium ion batteries. Because of the rich content of sodium in the crust and its similar physical and chemical properties to lithium, sodium ion batteries have been widely studied as an ideal substitute for lithium ion batteries.

Sodium ions have a large ionic radius, and the reversible deintercalation reaction requires large sodium storage sites and ion migration channels in the material structure. At present, the developed positive electrode materials suitable for sodium ion battery applications include vanadium sodium phosphate, Prussian blue, sodium manganate, sodium vanadate, and sodium binary or ternary oxides. The material with the structure of sodium superionic conductor (NASICON) has stable sodium storage sites, and the 3D open frame structure facilities the diffusion and migration of sodium ions. Vanadium sodium phosphate has been widely studied as a typical sodium superionic conductor material. There are many methods for preparing vanadium sodium phosphate materials. For example, vanadium sodium phosphate positive electrode materials were synthesized via sol-gel process by Dai Changsong et al. (Electrochimica Acta, 2013, 103:259-265) and in the Chinese patent application with Publication No. CN102496716A. However, sol-gel process suffers from the problems such as difficulty in guaranteeing reproducibility, long process time, troublesome post-processing, and difficulty in achieving large-scale production.

Since carbon greatly improves the electronic conductivity of the material, the amorphous carbon-coated vanadium sodium phosphate composite positive electrode material has a first-cycle discharge capacity that can basically reach 110 mAh/g or more, which can be close to its theoretical capacity (117.6 mAh/g), and has a higher voltage discharge platform of 3.4V. This exhibits its excellent comprehensive electrochemical performance, which is suitable for large-scale energy storage battery applications. However, most of the precursors of carbon-coated vanadium sodium phosphate reported by previous studies are prepared by ball milling method, but on the one hand, the ball milling method consumes a lot of energy, and on the other hand, it is difficult to avoid material waste and leakage during the process of preparation and material transfer. Therefore, how to prepare vanadium sodium phosphate positive electrode material through a cheap and environmentally friendly process route is one of the major challenges in the current process research.

In addition, the construction of nano-engineering and continuous conductive networks is effective means to prepare high-performance electrode materials. The two-dimensional sheet-like nanomaterials have a large specific surface area and many active sites, the special morphological structure thereof can not only accelerate the ion diffusion rate, but also provide ion insertion channels with short ion diffusion distances. Therefore, two-dimensional materials have broad application prospects in the art of energy storage. However, in the preparation process of the two-dimensional vanadium sodium phosphate nanomaterial, it is easy to agglomerate to form micron-sized secondary particles, and this problem has not been well solved yet.

Content of the Present Disclosure

The technical problem to be solved in the present disclosure is for overcoming the disadvantages of high energy consumption, easy agglomeration and the like in the preparation process of vanadium sodium phosphate positive electrode material, as well as the low capacity density and poor cycle stability of vanadium sodium phosphate electrode material in the prior art, therefore, the present disclosure provides a vanadium sodium phosphate positive electrode material and a preparation method therefor. The vanadium sodium phosphate positive electrode material of the present disclosure has high dispersibility, stable cycle performance when used in a battery, and can realize high-capacity charge and discharge of the battery; the preparation method has low energy consumption and is easy to realize large-scale production.

The present disclosure solves the above-mentioned technical problems through the following technical solutions:

A method for preparing a vanadium sodium phosphate positive electrode material, which comprises the following steps:

(1) performing a reaction in which an aqueous solution containing a vanadium source reacts with a phosphorus source, a reducing agent, a sodium source, and a carbon source; wherein the reaction comprises: the aqueous solution containing a vanadium source reacting first with the phosphorus source, and then with the reducing agent; or, the aqueous solution containing a vanadium source reacting first with the reducing agent and then with the phosphorus source;

(2) obtaining a reaction solution from step (1), drying and calcining the reaction solution.

In the present disclosure, the vanadium source may be a vanadium source conventionally used in the art, and preferably comprises one or more of vanadium pentoxide, ammonium metavanadate, vanadium acetylacetonate and vanadyl acetylacetonate.

In the present disclosure, the phosphorus source may be a phosphorus source conventionally used in the art, and preferably comprises one or more of phosphoric acid, sodium dihydrogen phosphate, diammonium hydrogen phosphate and ammonium dihydrogen phosphate. The sodium dihydrogen phosphate is preferably sodium dihydrogen phosphate dihydrate and/or anhydrous sodium dihydrogen phosphate. When the phosphorus source contains sodium atoms, the phosphorus source and the sodium source are the same substance.

In the present disclosure, the reducing agent may be a reducing sugar or a reducing acid. When the reducing agent is a reducing sugar, the reducing agent and the carbon source are the same substance. The reducing sugar refers to sugars that generate carbon dioxide under the condition of calcination at 400 to 450° C. The reducing sugar preferably comprises one or more of glucose, sucrose, and starch. The reducing acid preferably comprises one or more of oxalic acid dihydrate, citric acid monohydrate and anhydrous citric acid.

In order to solve the problems of the two-dimensional nano-morphic vanadium sodium phosphate electrode material in the prior art that it is easy to agglomerate during the preparation process and the resulting product has low dispersibility, the present disclosure provides a method for preparing a vanadium sodium phosphate nanosheet. The vanadium sodium phosphate nanosheet of the present disclosure has high dispersibility, stable cycle performance when used in a battery, and can realize high-capacity charge and discharge of the battery. The specific technical solutions are as follows:

A method for preparing a vanadium sodium phosphate nanosheet, which comprises the following steps:

S1, dissolving the vanadium source and the reducing acid in deionized water for performing a reaction to obtain reaction solution 1;

S2, adding the sodium source, the phosphorus source and the carbon source to the reaction solution 1 for performing a reaction to obtain reaction solution 2;

S3, reacting the reaction solution 2 with ethylene glycol to obtain reaction solution 3;

S4, mixing the reaction solution 3 with polyol to obtain a precursor mixture solution through the Ostwald ripening process;

S5, centrifuging the precursor mixture solution to obtain the precursor, and then drying to obtain a dried precursor;

S6, pre-calcining the dried precursor at 350-500° C. for 4 hours in a reducing gas atmosphere, then calcining at a high temperature of 600-700° C. for 7-12 hours, and cooling to room temperature to obtain a vanadium sodium phosphate composite material as a vanadium sodium phosphate nanosheet.

In the present disclosure, a molar ratio of vanadium in the vanadium source to the reducing acid described in S1 is preferably 2:3.

In the present disclosure, the reaction solution 1 described in S1 has a molar concentration of vanadium of preferably 0.2 mol/L.

In the present disclosure, the vanadium source described in S1 may be a vanadium source conventionally used in the art, and may be one or more of vanadium pentoxide ($V_2O_5$), ammonium metavanadate ($NH_4VO_3$), vanadium acetylacetonate ($C_{15}H_{21}O_6V$) and vanadyl acetylacetonate ($C_{10}H_{14}O_5V$).

In the present disclosure, the reducing acid described in S1 may be a reducing acid conventionally used in the art, and may be one or more of oxalic acid dihydrate, citric acid monohydrate and anhydrous citric acid;

In the present disclosure, the reaction described in S1 is carried out under conventional conditions in the art, preferably at 50-80° C. for 2 to 4 hours.

In the present disclosure, the sodium source and the phosphorus source described in S2 are added in conventional amounts in the art, preferably in a molar ratio of Na:V:P=(3~3.04):2:(3~3.04).

In the present disclosure, the sodium source described in S2 may be a sodium source conventionally used in the art, and may be one or more of sodium carbonate ($Na_2CO_3$), sodium dihydrogen phosphate dehydrate ($NaH_2PO_4 \cdot 2H_2O$), anhydrous sodium dihydrogen phosphate ($NaH_2PO_4$), and sodium acetate ($CH_3COONa$).

In the present disclosure, the phosphorus source described in S2 may be a phosphorus source conventionally used in the art, and may be one or more of phosphoric acid ($H_3PO_4$), sodium dihydrogen phosphate dehydrate ($NaH_2PO_4 \cdot 2H_2O$) and anhydrous sodium dihydrogen phosphate ($NaH_2PO_4$).

In the present disclosure, the carbon source described in S2 may be a carbon source conventionally used in the art, and may be one or more of glucose, sucrose and dopamine; the carbon source described in S2 may have an addition amount of 0.49~9.82 times the mass of vanadium.

In the present disclosure, the reaction described in S2 is carried out for a conventional period in the art, preferably a period of 0.5~1 h.

In the present disclosure, the ethylene glycol and water contained in the reaction solution 2 described in S3 has a volume ratio of preferably 0.5:1 to 10:1.

In the present disclosure, the reaction described in S3 is preferably carried out for 20-60 minutes.

In the present disclosure, the polyol described in S4 is n-propanol or isopropanol.

In the present disclosure, the polyol and water contained in the reaction solution 3 described in S4 has a volume ratio of preferably 2.5:1 to 5:1.

In the present disclosure, the polyol described in S4 has an addition rate of preferably 2 to 4 mL/min.

In the present disclosure, the drying described in S5 is carried out by any one of the following methods: blast drying at 25-50° C. for 6-12 hours, vacuum drying at 25-50° C. for 6-12 hours, and freeze drying for 10 to 48 hours.

In the present disclosure, S6 is performed in a tube furnace, at a conventional heating rate in the art, preferably 2-10° C./min;

In the present disclosure, the reducing gas described in S6 is conventional in the art, preferably a $H_2$/Ar mixed gas, wherein $H_2$ has a volume percentage of 5%-10%.

The present disclosure also provides a vanadium sodium phosphate nanosheet prepared by the method. The vanadium sodium phosphate nanosheet generally has a length and a width of 100-150 nm, and a thickness of about 20-30 nm.

The present disclosure also provides a sodium ion battery, wherein the sodium ion battery employs the vanadium sodium phosphate nanosheet as a positive electrode material, and metallic sodium as a negative electrode. The sodium ion battery may be a button battery.

The present disclosure also provides a use of the vanadium sodium phosphate nanosheet in a sodium ion battery.

In the existing preparation process of the vanadium sodium phosphate composite positive electrode material, the ball milling method not only consumes huge energy, but also inevitably wastes and leaks materials during the preparation and material transfer process, and is not environmentally friendly; the sol-gel process suffers from the problems such as difficulty in guaranteeing reproducibility, long process time, troublesome post-processing, and difficulty in achieving large-scale production. In order to solve these problems in the prior art, the present disclosure provides a method for preparing a carbon-coated vanadium sodium phosphate composite positive electrode material, which comprises the following steps:

i) carrying out a mixing reaction between an aqueous solution containing the vanadium source and the phosphorus source to obtain reaction solution A, and the mixing reaction is carried out at a pH of 4-7;

ii) carrying out a first mixing reaction between the slurry and the reducing sugar to obtain reaction solution C;

when the phosphorus source does not contain sodium atoms, the slurry is a reaction solution B obtained from a second mixing reaction between the reaction solution A in step i) and the sodium source;

when the phosphorus source contains sodium atoms, the slurry is the reaction solution A in step i);

iii) spray drying and calcining the reaction solution C.

In step i), the vanadium source may be a vanadium source conventionally used in the art, and is preferably an ammonium metavanadate $NH_4VO_3$ and/or a vanadium pentoxide.

In step i), the aqueous solution containing the vanadium source may be prepared by conventional methods in the art, and is generally prepared by the following steps: dissolving the vanadium source in water and heating to complete dissolution. The water is generally deionized water. Wherein, the operation and conditions of heating can be conventional in the art, and the temperature after heating is generally above 90° C.

In step i), the vanadium source in the aqueous solution containing the vanadium source may have a conventional concentration in the art, and preferably 0.1 mol/L to 0.5 mol/L, such as 0.15 mol/L or 0.2 mol/L.

In step i), the phosphorus source may be a phosphorus source conventionally used in the art, and is preferably one or more of phosphoric acid ($H_3PO_4$), sodium dihydrogen phosphate ($NaH_2PO_4$), diammonium hydrogen phosphate (($NH_4)_2HPO_4$), and ammonium dihydrogen phosphate ($NH_4H_2PO_4$).

In step i), a molar ratio of vanadium atoms to phosphorus atoms may be conventional in the art, and is generally 2:3.

In step i), the operation and conditions of the mixing reaction may be conventional in the art. The mixing reaction is carried out at a temperature of preferably 88-95° C., more preferably 90° C. The mixing reaction is carried out for a period of preferably 8-12 minutes, more preferably 10 minutes.

In step i), the mixing reaction is carried out at a pH of preferably 5-6.

In step ii), the reducing sugar generally refers to sugars that generate carbon dioxide under the condition of calcination at 400-450° C.; the reducing sugar is preferably one or more of glucose, sucrose and starch.

In step ii), the reducing sugar may have a conventional amount in the art, the amount is preferably as follows: the carbon after carbonization of the reducing sugar accounts for 3%-20% of the total mass of the carbon-coated vanadium sodium phosphate composite positive electrode material, more preferably 4%-8.5%, such as 4.4%, 4.5%, 5% or 8.5%.

In step ii), the operation and conditions of the first mixing reaction may be conventional in the art. The first mixing reaction is carried out at a temperature of preferably 85-95° C., more preferably 90° C. The period of the first mixing reaction is based on the time required for the solution to change from orange to colorless and then to dark green colloid, generally 40 min-2 h, for example 60 min, at this time the polyvanadate ion in the solution is reduced to $V^{3+}$ and $VO^{2+}$.

In step ii), the sodium source may be a sodium source conventionally used in the art, and is preferably one or more of sodium carbonate ($Na_2CO_3$), sodium dihydrogen phosphate ($NaH_2PO_4$), sodium oxalate, sodium citrate and sodium bicarbonate.

In the slurry, sodium atoms, vanadium atoms and phosphorus atoms may have a conventional molar ratio in the art, and generally 3:2:3.

In step ii), the operation and conditions of the second mixing reaction may be conventional in the art. The second mixing reaction is carried out at temperature of preferably 88-95° C. The period for the second mixing reaction is based on the total release of carbon dioxide, and is generally 8-12 min, for example 10 min.

In step ii), the second mixing reaction may be carried out at a conventional pH in the art, preferably 6-9, more preferably 7.5-8.

In step iii), in the reaction solution C, vanadium ions have a concentration of preferably 0.1-0.5 mol/L, such as 0.2 mol/L.

In step iii), the operation and conditions of the spray drying may be conventional in the art. The spray drying is preferably carried out under the conditions as follows: inlet temperature is 180-200° C., gas flow rate is 660-1000 L/h, and feed pump flow rate is 200-900 mL/h.

In step iii), the calcining may be carried out under conventional conditions in the art. Generally, the precursor obtained after spray drying is heated in a tube furnace to the calcining temperature under an inert atmosphere. Wherein, the temperature increase rate may be conventional in the art, and is generally 3 to 8° C./min, for example, 5° C./min. The inert atmosphere may be an atmosphere conventional in the art that does not participate in chemical reactions at the calcining temperature, such as nitrogen or argon.

In step iii), the calcining may be carried out at a temperature of 400-600° C., preferably 400-450° C. In the present disclosure, under a specific dissolution pH in the previous steps (the pH of the solution will greatly affect the morphology of the metavanadate ion, thereby affecting the subsequent reaction process), the mononuclear metavanadate is fully polymerized, which is not only conductive to forming larger crystalline structure in the sintering process, but also the polyvanadate can be reduced to the greatest extent. The electrochemically active positive electrode material can be obtained in the later calcination process without the need for high temperature treatment in the traditional preparation process (usually >600° C.), which can largely reduce energy consumption. If the calcining temperature is too high, for example >780° C., new impurities may even be formed.

In step iii), the calcining may be carried out for a conventional period in the art, and preferably 6-15 h.

In step iii), natural cooling is generally performed after the calcining.

The present disclosure also provides a carbon-coated vanadium sodium phosphate composite positive electrode material prepared by the preparation method. The carbon-coated vanadium sodium phosphate composite positive electrode material may have a particle size of 2 μm to 5 μm. In the carbon-coated vanadium sodium phosphate composite positive electrode material, the carbon coating layer may have a conventional thickness in the art, preferably 6 nm to 15 nm, such as 10 nm or 11 nm.

The present disclosure also provides a sodium ion battery, wherein the sodium ion battery employs the carbon-coated vanadium sodium phosphate composite positive electrode material as a positive electrode material, and metallic sodium as a negative electrode. The sodium ion battery may be a button battery.

The present disclosure also provides a use of the carbon-coated vanadium sodium phosphate composite positive electrode material in a sodium ion battery.

In the present disclosure, the above-mentioned "first" and "second" have no special meaning, and are only used to distinguish different mixing reactions.

On the basis of conforming to common knowledge in the art, the above-mentioned preferred conditions can be combined arbitrarily to obtain preferred embodiments of the present disclosure.

The agents and raw materials used in the disclosure can be commercially available.

The positive and progressive effects of the present disclosure are:

The vanadium sodium phosphate positive electrode of the present disclosure has high dispersibility, stable cycle performance when used in a battery, and can realize high-capacity charge and discharge of the battery; the preparation method therefor has low energy consumption and is easy to realize large-scale production.

The method for preparing the vanadium sodium phosphate nanosheet provided by the present disclosure is not prone to agglomeration during the preparation process, and the obtained vanadium sodium phosphate nanosheet has high dispersibility. The vanadium phosphate sodium nanosheet provided by the present disclosure has fast ion and electron diffusion rate when used as positive electrode material in a battery, and the battery has good cycle stability, and ultra-high high-current charge and discharge performance.

In the method for preparing the carbon-coated vanadium sodium phosphate composite positive electrode material provided by the present disclosure, the raw materials are all dissolved in water instead of forming suspension in the usual process; the polymerization of mononuclear metavanadate is achieved through a specific feeding sequence, thus facilitating the formation of a larger crystal structure during sintering; and then a precursor is obtained by efficient spray drying, which can achieve 100% utilization of raw materials and zero pollution discharge to the environment; compared to the solid state synthesis, most of the pentavalent vanadium ions in this method can be reduced to trivalent by reducing sugar in the solution, without the traditional long-term high-temperature calcination in the later stage, which significantly reduces the energy consumption and it is easy to realize large-scale production. In addition, in the present disclosure, cheap and easily available reducing sugars are selected as the carbon source, which greatly reduces the cost while still maintaining excellent performance. The method can effectively control the particle size of the precursor, which has homogeneous size, good dispersion, and no agglomeration. The carbon-coated vanadium sodium phosphate composite positive electrode material calcined from the precursor has good consistency, which can be controlled within 2 μm~5 μm. While having high specific capacity and good rate performance, it also exhibits excellent charge and discharge cycle stability, thereby improving the electrochemical performance and energy density of sodium ion batteries. The method facilitates the practical development of sodium ion batteries, and is suitable for commercial large-scale production, which has broad application prospects in the art of large-scale and high-power battery energy storage.

DETAILED DESCRIPTION OF THE PREFERRED EMBODIMENT

Figure 1:
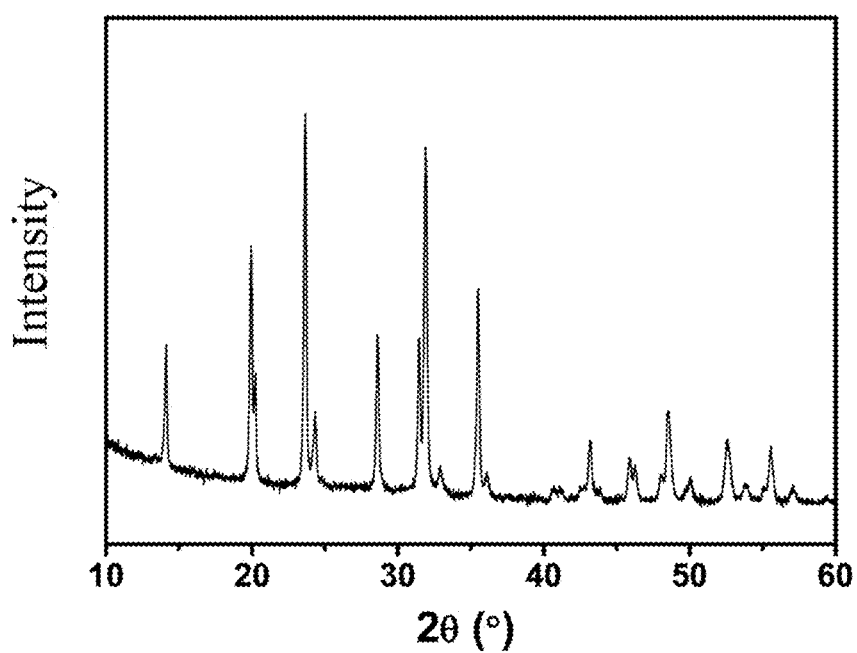
FIG. 1 is an X-ray diffraction pattern of vanadium sodium phosphate prepared in Example 3 of the present disclosure.

The present disclosure will be further illustrated by the following examples, but the present disclosure is not limited thereto. Experimental methods for which specific conditions are not indicated in the following examples shall be selected according to conventional methods and conditions, or according to the commodity specification.

Example 1

0.756 g of oxalic acid dehydrate was added into 20 mL of water for ultrasonic dissolution, then 0.364 g of vanadium pentoxide was added, and stirred for 2 hours in an oil bath at 70° C. Subsequently, 0.936 g of sodium dihydrogen phosphate dihydrate and 0.13 g of sucrose were added to the solution, stirred for 30 minutes and then added with 10 mL of ethylene glycol solution, and stirred for 1 hour. After the completion of the reaction, 50 mL of n-propanol solution was added at a rate of 2 mL/min, and reacted for 30 minutes to obtain a precursor mixture solution. The obtained precursor mixture solution was separated by centrifugation and then freeze-dried for 24 hours to obtain the precursor. The obtained precursor was pre-calcined for 4 hours in a tube furnace which was heated at 5° C./min to 400° C. under a 5% $H_2$/Ar atmosphere, then heated to 700° C., calcined at high temperature for 8 hours, and then cooled to room temperature, to obtain the vanadium sodium phosphate nanosheets.

Example 2

0.756 g of oxalic acid dehydrate was added into 20 mL of water, and for ultrasonic dissolution, then 0.364 g of vanadium pentoxide was added, and stirred for 2 hours in an oil bath at 70° C. Subsequently, 0.936 g of sodium dihydrogen phosphate dihydrate and 0.13 g of sucrose were added to the solution, stirred for 30 minutes and then added with 40 mL of ethylene glycol solution, and stirred for 1 hour. After the completion of the reaction, 60 mL of n-propanol solution was added at a rate of 2 mL/min, and reacted for 30 minutes to obtain a precursor mixture solution. The obtained precursor mixture solution was separated by centrifugation and then freeze-dried for 24 hours to obtain the precursor. The obtained precursor was pre-calcined for 4 hours in a tube furnace which was heated at 5° C./min to 400° C. under a 5% $H_2$/Ar atmosphere, then heated to 700° C., calcined at high temperature for 8 hours, and then cooled to room temperature, to obtain the vanadium sodium phosphate nanosheets.

Example 3

0.756 g of oxalic acid dehydrate was added into 20 mL of water, and for ultrasonic dissolution, then 0.364 g of vanadium pentoxide was added, and stirred for 2 hours in an oil bath at 80° C. Subsequently, 0.950 g of sodium dihydrogen phosphate dihydrate and 1.0 g of glucose were added to the solution, stirred for 30 minutes and then added with 100 mL of ethylene glycol solution, and stirred for 1 hour. After the completion of the reaction, 200 mL of n-propanol solution was added at a rate of 4 mL/min, and reacted for 50 minutes to obtain a precursor mixture solution. The obtained precursor mixture solution was separated by centrifugation and then blast-dried at 50° C. for 24 hours to obtain the precursor. The obtained precursor was pre-calcined for 4 hours in a tube furnace which was heated at 10° C./min to 400° C. under a 5% $H_2$/Ar atmosphere, then heated to 700° C., calcined at high temperature for 8 hours, and then cooled to room temperature, to obtain the vanadium sodium phosphate nanosheets.

Comparative Example 1

0.756 g of oxalic acid dehydrate was added into 20 mL of water, and for ultrasonic dissolution, then 0.364 g of vanadium pentoxide was added, and stirred for 2 hours in an oil bath at 70° C. Subsequently, 0.936 g of sodium dihydrogen phosphate dihydrate and 0.13 g of glucose were added to the solution, stirred for 30 minutes. After the completion of the reaction, 50 mL of isopropanol solution was added at a rate of 4 mL/min, and reacted for 30 minutes to obtain a precursor mixture solution. The obtained precursor mixture solution was separated by centrifugation and then blast-dried at 50° C. for 8 hours to obtain the precursor. The obtained precursor was pre-calcined for 4 hours in a tube furnace which was heated at 5° C./min to 400° C. under a 5% $H_2$/Ar atmosphere, then heated to 700° C., calcined at high temperature for 8 hours, and then cooled to room temperature, to obtain the vanadium sodium phosphate sample.

Example 4

A method for preparing a carbon-coated vanadium sodium phosphate composite positive electrode material, specifically comprising the following steps:

1) 17.5467 g of ammonium metavanadate was added into 500 mL of deionized water, and heated to dissolve (the heating temperature is generally above 90° C.) to obtain an aqueous solution containing vanadium source (wherein, the concentration of vanadium source is 0.2 mol/L); 25.8818 g of ammonium dihydrogen phosphate was added and stirred for 10 min at 90° C. in an oil bath to obtain reaction solution A; the pH value of reaction solution A was 4;

2) 11.9239 g of sodium carbonate was added into reaction solution A for a mixing reaction. The mixing reaction was carried out at 88° C. for 10 min, until carbon dioxide bubbles were no longer generated in the solution, to obtain reaction solution B; the pH value of the reaction solution B was 7.5; in the reaction solution B, the molar ratio of sodium atoms, vanadium atoms and phosphorus atoms was 3:2:3;

3) 9.3984 g of sucrose was added to the reaction solution B at this temperature, and the mixing reaction was carried out at 90° C. for 60 min, until the solution turned dark green and the color did not change. After the completion of the reaction, the solution was naturally cooled to obtain reaction solution C (dark green colloidal solution);

4) the reaction solution C with a concentration of 0.2 mol/L (based on vanadium ions) was spray dried to obtain precursor particles; spray drying parameters are as follows: inlet temperature is 200° C., gas flow rate is 1000 L/h, and feed pump flow rate is 500 mL/h;

The obtained precursor was sintered for 15 hours in a tube furnace under a nitrogen atmosphere at 400° C. with a heating rate of 5° C./min, and then naturally cooled to room temperature to obtain a carbon-coated vanadium sodium phosphate composite positive electrode material with good dispersibility. The carbon content accounts for 4.4% of the total mass, and the thickness of the carbon coating layer is 10 nm.

Example 5

A method for preparing a carbon-coated vanadium sodium phosphate composite positive electrode material, specifically comprising the following steps:

1) 17.55 g of ammonium metavanadate was added into 500 mL of deionized water, and heated to dissolve (the heating temperature is generally above 90° C.) to obtain an aqueous solution containing vanadium source (wherein, the concentration of vanadium source is 0.2 mol/L); 27.125 g of sodium dihydrogen phosphate was added and stirred for 10 min at 95° C. in an oil bath to obtain reaction solution A; the pH value of reaction solution A was 5;

in the reaction solution A, the molar ratio of sodium atoms, vanadium atoms and phosphorus atoms was 3:2:3;

2) 9.4 g of sucrose was added to the reaction solution A at this temperature, and the mixing reaction was carried out at 90° C. for 60 min, until the solution turned dark green and the color did not change. After the completion of the reaction, the solution was naturally cooled to obtain reaction solution D (dark green colloidal solution);

4) the reaction solution C with a concentration of 0.2 mol/L (based on vanadium ions) was spray dried to obtain precursor particles; spray drying parameters are as follows: inlet temperature is 200° C., gas flow rate is 1000 L/h, and feed pump flow rate is 500 mL/h;

The obtained precursor was sintered for 15 hours in a tube furnace under a nitrogen atmosphere at 400° C. with a heating rate of 5° C./min, and then naturally cooled to room temperature to obtain a carbon-coated vanadium sodium phosphate composite positive electrode material with good dispersibility. The carbon content accounts for 4.5% of the total mass, and the thickness of the carbon coating layer is about 10 nm.

Example 6

1) 17.5467 g of ammonium metavanadate was added into 500 mL of deionized water, and heated to dissolve at 95° C. to obtain an aqueous solution with the concentration of 0.2 mol/L; 25.8818 g of ammonium dihydrogen phosphate was added and stirred for 10 min at 90° C. in an oil bath to obtain reaction solution A; the pH value of reaction solution A was 4;

2) 11.9239 g of sodium carbonate was added into reaction solution A for a mixing reaction. The mixing reaction was carried out at 88° C. for 10 min, until carbon dioxide bubbles were on longer generated in the solution, to obtain reaction solution B; the pH value of the reaction solution B was 7.5;

in the reaction solution B, the molar ratio of sodium atoms, vanadium atoms and phosphorus atoms was 3:2:3;

3) 18.88 g of glucose was added to the reaction solution B at this temperature, and the mixing reaction was carried out at 90° C. for 70 min, until the solution turned dark green and the color did not change. After the completion of the reaction, the solution was naturally cooled to obtain reaction solution C (dark green colloidal solution);

4) the reaction solution C with a concentration of 0.2 mol/L (based on vanadium) was spray dried to obtain precursor particles; spray drying parameters are as follows: inlet temperature is 200° C., gas flow rate is 1000 L/h, and feed pump flow rate is 500 mL/h;

The obtained precursor was sintered for 15 hours in a tube furnace under a nitrogen atmosphere at 400° C. with a heating rate of 5° C./min, and then naturally cooled to room temperature to obtain a carbon-coated vanadium sodium phosphate composite positive electrode material with good dispersibility. The carbon content accounts for 8.5% of the total mass, and the thickness of the carbon coating layer is 11 nm.

Comparative Example 2

A method for preparing a carbon-coated vanadium sodium phosphate composite positive electrode material, specifically comprising the following steps:

1) 35.0934 g of ammonium metavanadate was added into 1000 mL of deionized water, and heated to dissolve at 90° C. to obtain an aqueous solution containing vanadium source (wherein, the concentration of vanadium source is 0.15 mol/L); 11.9239 g of sodium carbonate was added and stirred for 20 min at 90° C. in an oil bath to obtain reaction solution A; the pH value of reaction solution A was 12.5;

2) 53.99 g of ammonium dihydrogen phosphate was added into reaction solution A for a mixing reaction. The mixing reaction was carried out at 90° C. for 20 min to obtain reaction solution B; the pH value of the reaction solution B was 8;

in the reaction solution B, the molar ratio of sodium atoms, vanadium atoms and phosphorus atoms was 3:2:3;

3) 18.7968 g of sucrose (the carbon after carbonization of the sucrose accounted for 4% of the total mass of the carbon-coated vanadium sodium phosphate composite positive electrode material) was added to the reaction solution B at this temperature, and the mixing reaction was carried out at 90° C. for 60 min, until the solution turned dark green and the color did not change. After the completion of the reaction, the solution was naturally cooled to obtain reaction solution C (dark green colloidal solution);

4) the reaction solution C with a concentration of 0.15 mol/L was spray dried to obtain precursor particles; spray drying parameters are as follows: inlet temperature is 200° C., gas flow rate is 1000 L/h, and feed pump flow rate is 500 mL/h;

The obtained precursor was sintered for 15 hours in a tube furnace under a nitrogen atmosphere at 400° C. with a heating rate of 5° C./min, and then naturally cooled to room temperature to obtain a carbon-coated vanadium sodium phosphate composite positive electrode material with good dispersibility.

Effect Example 1: X-Ray Diffraction Test

The X-ray diffraction pattern of the sample prepared in Example 3 was measured with the German D8 Advance, wherein, Cu-Kα was used as the ray source, the tube voltage was 40 KV, the tube flow was 40 mA, the scanning speed was 2°/min, and the measurement range was $10°≤2θ≤60°$.

FIG. 1 is an X-ray diffraction pattern of vanadium sodium phosphate nanosheets prepared in Example 3. It can be seen from FIG. 1 that the prepared vanadium sodium phosphate nanosheets have good crystallinity, sharp peak shapes, and a good NASICON structure phase without the formation of impurity phases.

Effect Example 2: Scanning Electron Microscope Test

The scanning electron microscope test of the samples prepared in Example 2 and Comparative Example 1 was performed using Nova NanoSEM 450.

Figure 2:
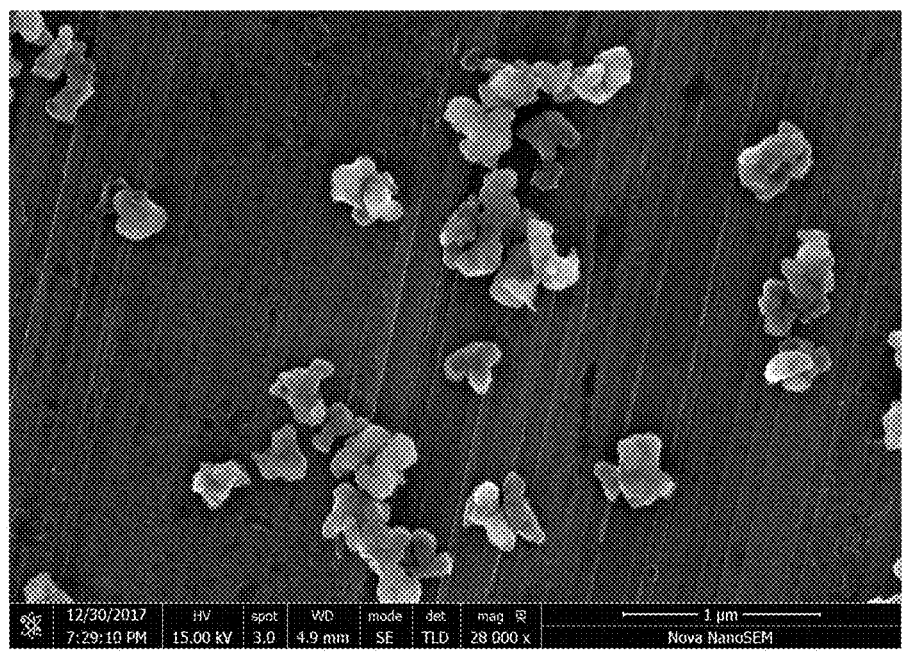
FIG. 2 is a scanning electron micrograph of vanadium sodium phosphate prepared in Example 2 of the present disclosure.

FIG. 2 is a scanning electron micrograph of vanadium sodium phosphate nanosheets prepared in Example 2. It can be seen from the figure that the surface of the prepared vanadium sodium phosphate nanosheets is smooth, the length and width of the nanosheets are about 100-150 nm, and the thickness of which is between 20-30 nm.

Figure 3:
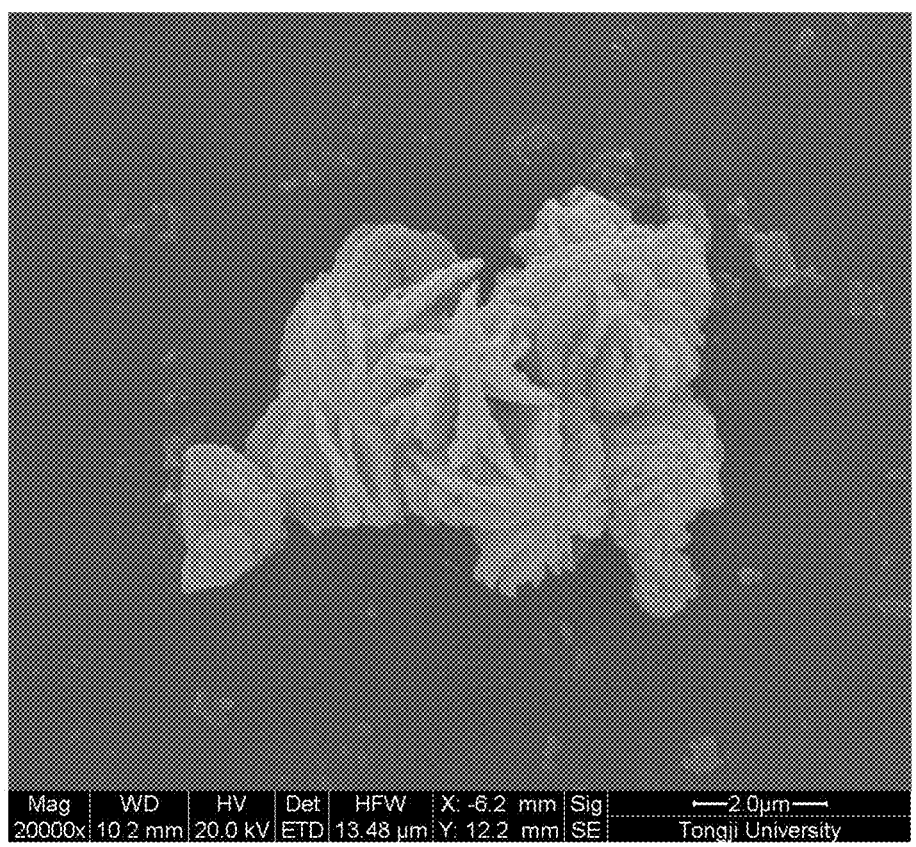
FIG. 3 is a scanning electron micrograph of vanadium sodium phosphate prepared in Comparative Example 1 of the present disclosure.

FIG. 3 is a scanning electron micrograph of Comparative Example 1. It can be seen from FIG. 3 that when no ethylene glycol was added during the preparation process, the prepared vanadium sodium phosphate is in the form of microspheres and has poor dispersibility.

Effect Example 3: Electrical Performance Test (1) Preparation of Battery

The vanadium sodium phosphate prepared in Example 1, Example 2, Example 3 and Comparative Example 1 were used as the positive electrode, and sodium metal was used as the negative electrode, to prepare button batteries according to conventional methods in the art.

(2) Charge and Discharge Performance Test

According to conventional methods in the art, the charge and discharge performance of button batteries made with vanadium sodium phosphate prepared in Example 1, Example 2, and Comparative Example 1 were measured at different rates.

Figure 4:
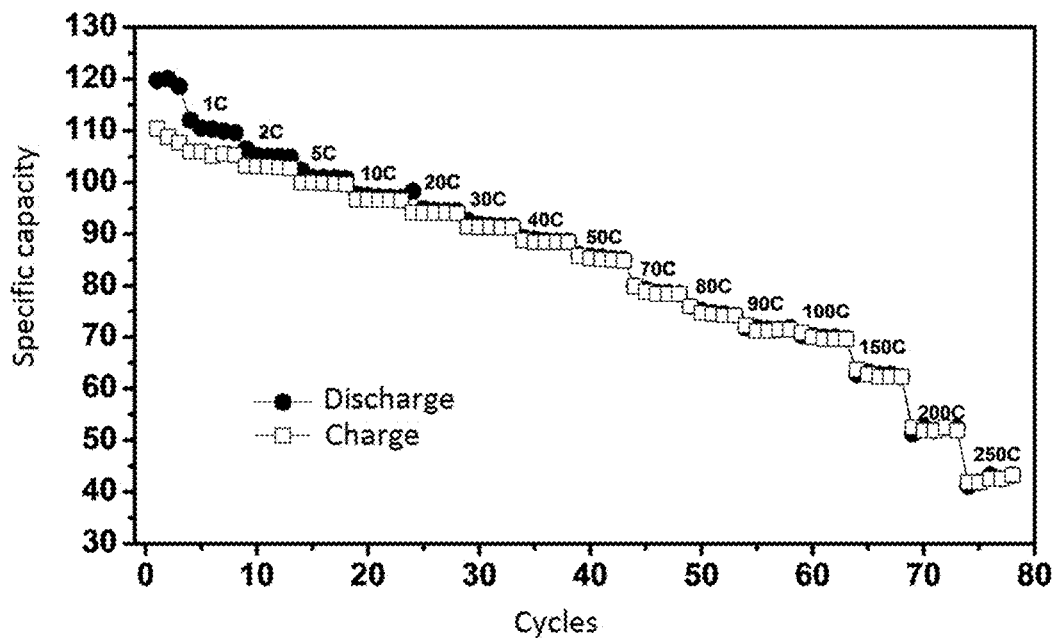
FIG. 4 is a graph showing the charge and discharge performance of vanadium sodium phosphate prepared in Example 1 of the present disclosure at different rate s.

FIG. 4 is a graph showing the charge and discharge performance of vanadium phosphate sodium prepared in Example 1 at different rates. Under the current densities of 5 C, 50 C, 100 C, and 200 C, the prepared vanadium sodium phosphate samples respectively exhibited discharge specific capacities of 100.0 mAh $g^{-1}$, 85.8 mAh $g^{-1}$, 70.9 mAh $g^{-1}$ and 52.5 mAh $g^{-1}$.

Figure 5:
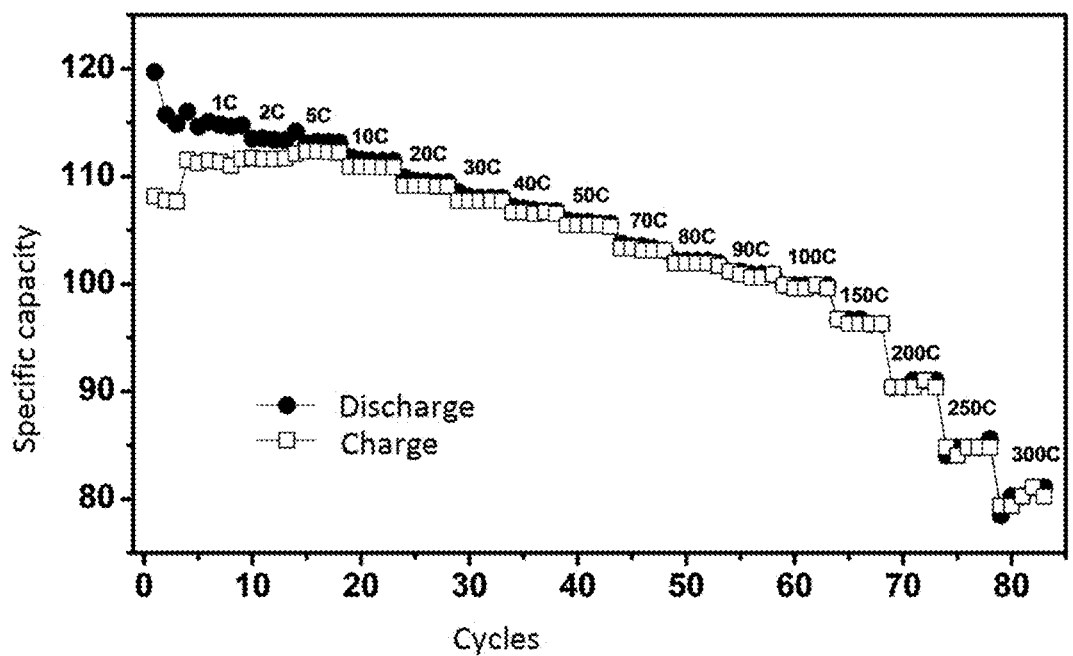
FIG. 5 is a graph showing the charge and discharge performance of vanadium sodium phosphate prepared in Example 2 of the present disclosure at different rates.

FIG. 5 is a graph showing the charge and discharge performance of vanadium sodium phosphate prepared in Example 2 at different rates, which fully demonstrates that the prepared vanadium sodium phosphate nanosheets have ultra-high rate performance, under the current densities of 5 C, 50 C, and 100 C, the vanadium sodium phosphate nanosheets respectively exhibited discharge specific capacities of 112.1 mAh$g^{-1}$, 105.5 mAh $g^{-1}$ and 99.9 mAh $g^{-1}$. When the current density is as high as 200 C and 300 C, the specific capacity can still be maintained at 90.4 mAh $g^{-1}$ and 79.3 m Ah $g^{-1}$, the capacity retention rate of the electrode is very good, indicating that the prepared vanadium sodium phosphate nanosheets are less polarized.

Figure 6:
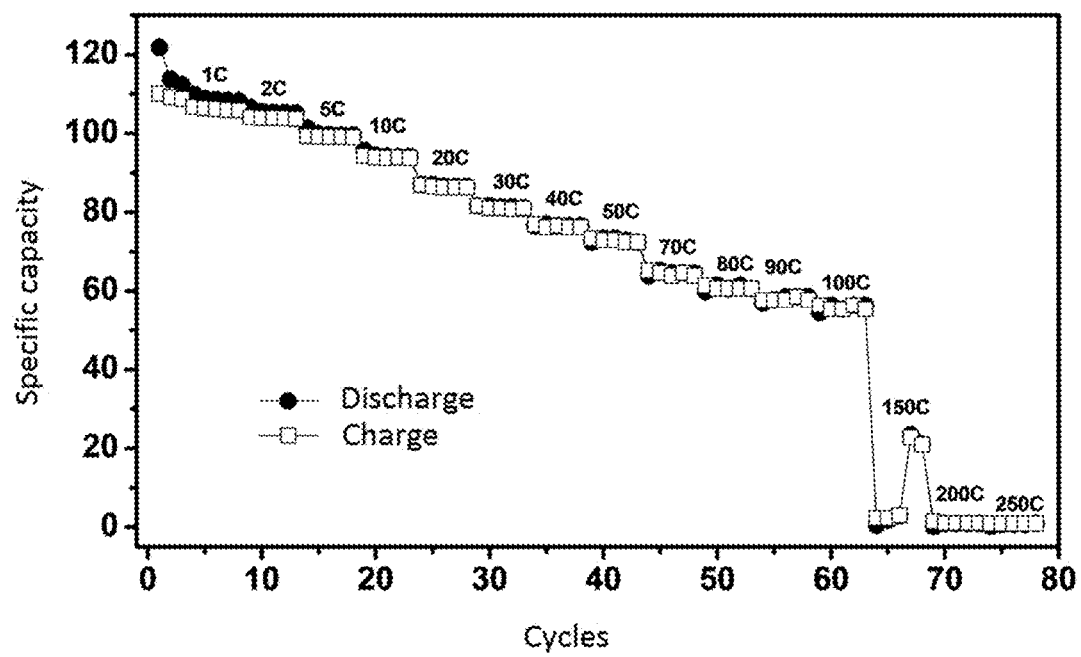
FIG. 6 is a graph showing the charge and discharge performance of vanadium sodium phosphate prepared in Comparative Example 1 of the present disclosure at different rates.

FIG. 6 is a graph showing the charge and discharge performance of vanadium sodium phosphate prepared in Comparative Example 1 at different rates. Since no ethylene glycol was added, the vanadium sodium phosphate prepared in Comparative Example has agglomeration and poor diffusion power, and respectively exhibited discharge specific capacities of 99.3 mAh $g^{-1}$, 73.4 mAh $g^{-1}$, and 56.4 mAh $g^{-1}$ under the current density of 5 C, 50 C and 100 C. When the current density increases to 150 C and 200 C, the electrode can no longer show any capacity, indicatiing that the capacity retention is poor.

(3) Cyclic Voltammetry Test

Figure 7:
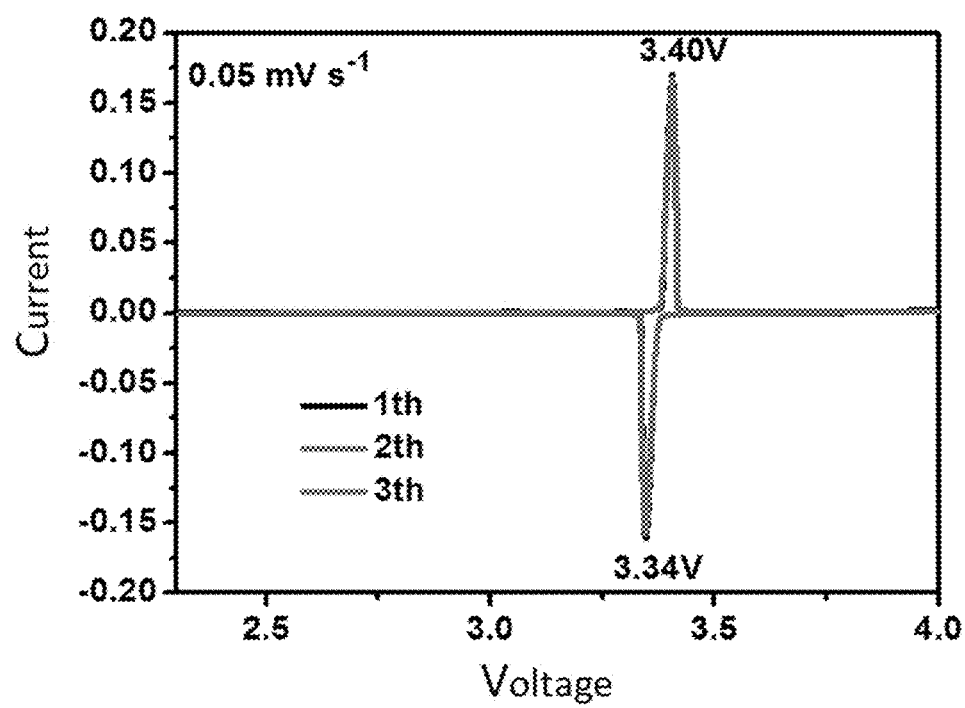
FIG. 7 is a cyclic voltammogram of vanadium sodium phosphate prepared in Example 3 of the present disclosure at a scanning rate of 0.05 mV s-1.

The electrode potential was controlled according to different rates, and the time was scanned with a triangular waveform one or more times, so that different reduction and oxidation reactions can occur alternately on the electrode. Meanwhile, the corresponding current-potential curve was recorded, and the reversibility of electrode reaction or the possibility of new phase formation can be judged according to the peak position and shape. Cyclic voltammetry test was performed on the button battery made with vanadium sodium phosphate prepared in Example 3 using Bio-logic VMP-300. The cyclic voltammetry diagram obtained at a scanning rate of 0.05 mV·$s^{-1}$ is shown in FIG. 7. It can be seen from the figure that at a scanning rate of 0.05 mV·$s^{-1}$, the sample presents a pair of typical redox peaks of vanadium sodium phosphate electrode materials, with the peak position of the oxidation peak at about 3.40V and the peak position of the reduction peak at 3.34V. The peak potential difference is only 60 mV, and the reversibility is very good.

Effect Example 4

Figure 8:
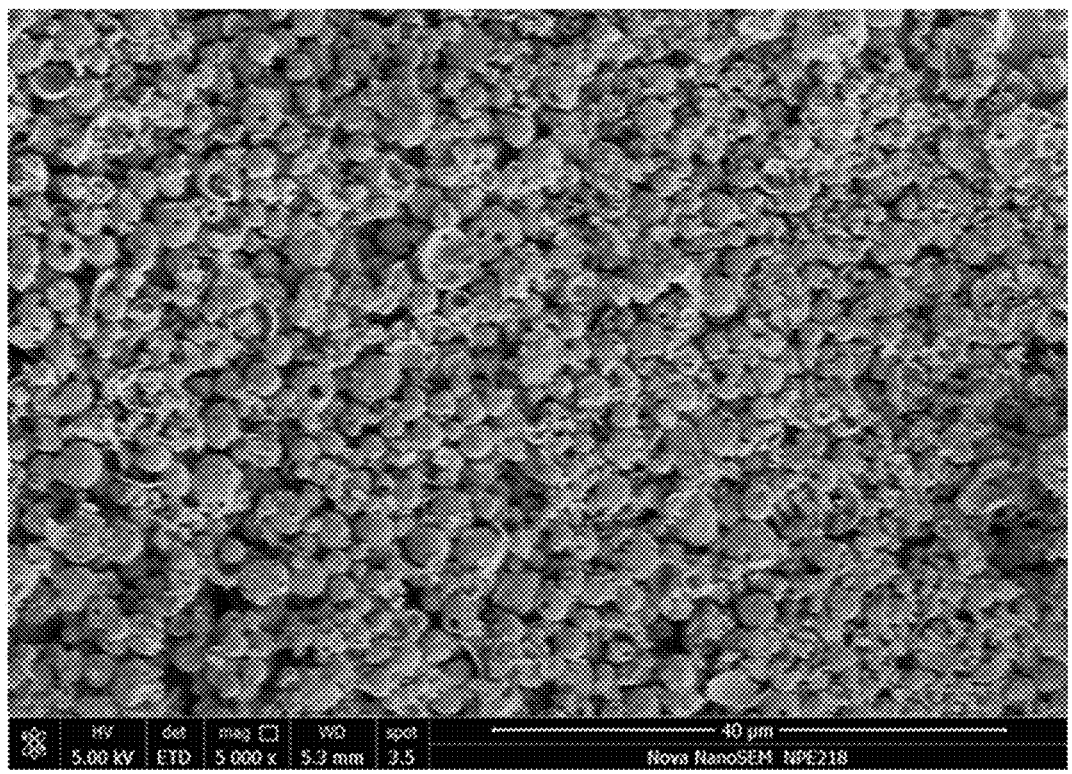
FIG. 8 is a scanning electron micrograph of the precursor of vanadium sodium phosphate prepared in Example 4.

FIG. 8 is a scanning electron micrograph of the vanadium sodium phosphate precursor prepared in Example 4. It can be seen from the figure that vanadium sodium phosphate has good crystallinity, sharp peak shape, and good NASICON structural phase.

Figure 9:
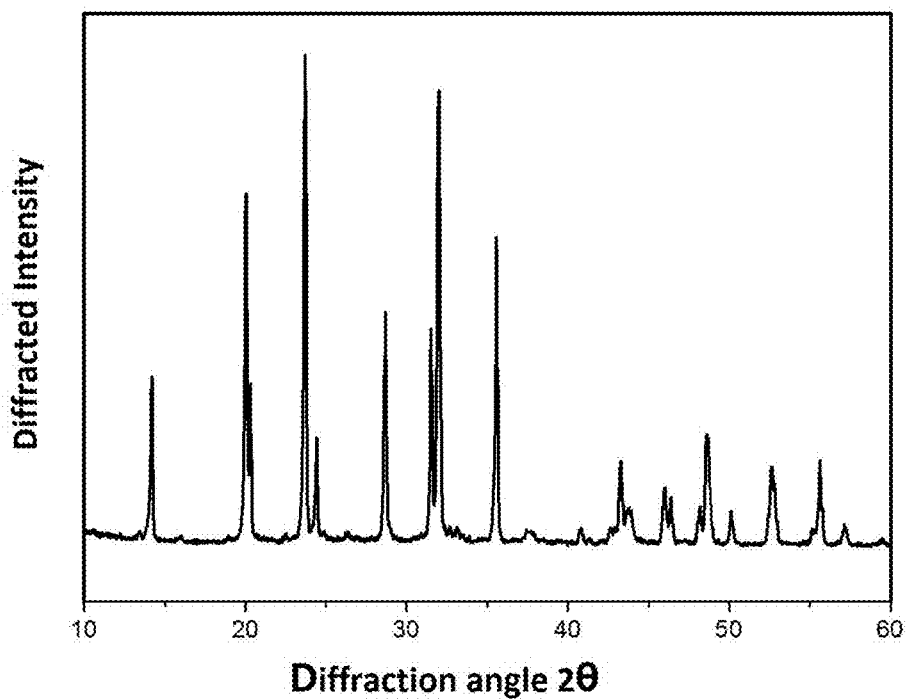
FIG. 9 is an X-ray diffraction pattern of the carbon-coated vanadium sodium phosphate composite positive electrode material prepared in Example 4.

FIG. 9 is an X-ray diffraction pattern of the carbon-coated vanadium sodium phosphate composite positive electrode material prepared in Example 4. It can be seen from FIG. 9 that the product is a carbon-coated vanadium sodium phosphate composite positive electrode material.

Figure 10:
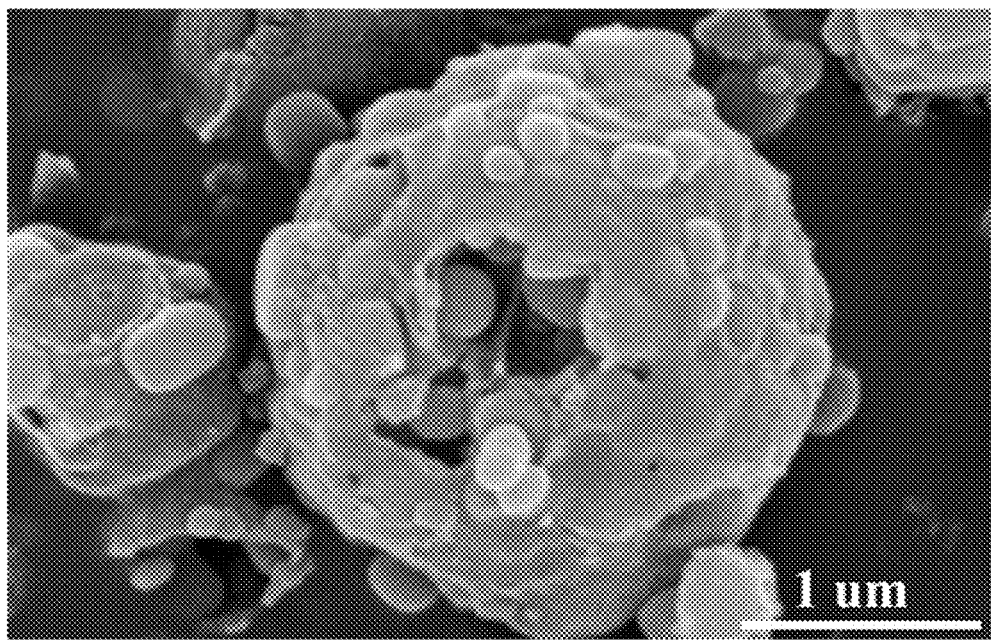
FIG. 10 is a scanning electron micrograph of the carbon-coated vanadium sodium phosphate composite positive electrode material prepared in Example 4.

FIG. 10 is a scanning electron micrograph of the carbon-coated vanadium sodium phosphate composite positive electrode material prepared in Example 4. It can be seen from FIG. 10 that the material has a particle size of about 2 μm, and a homogeneous distribution of the particle size.

Figure 11:
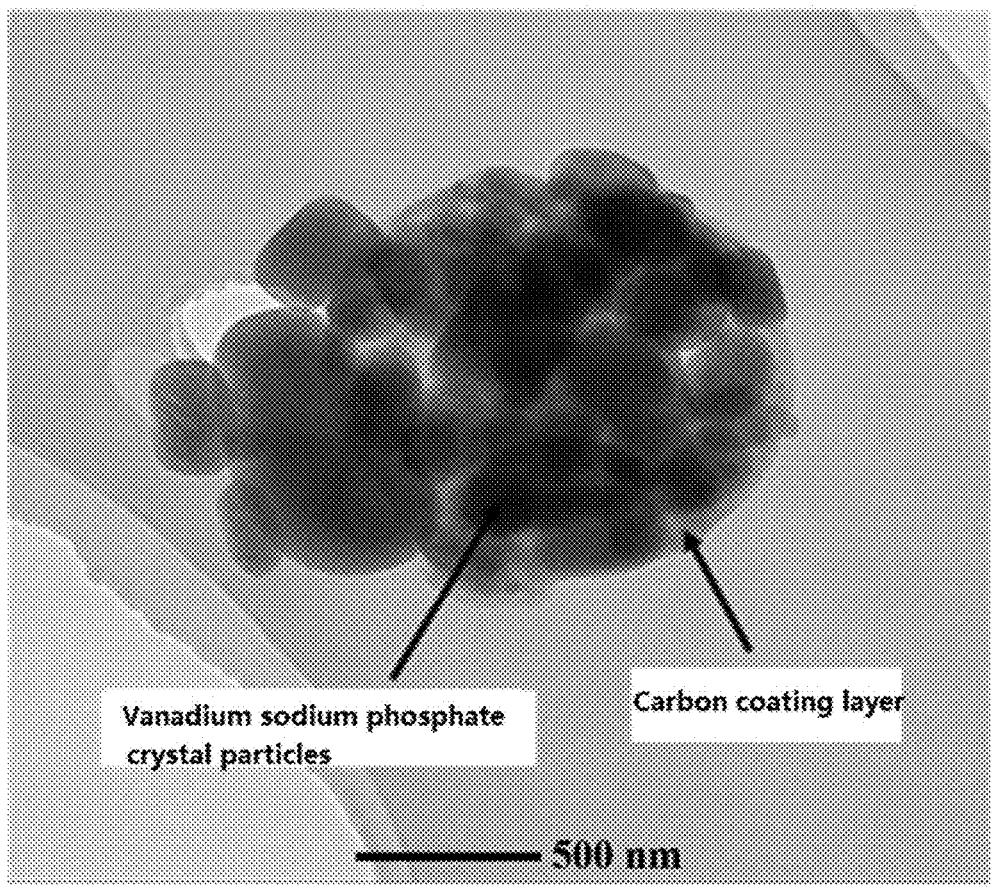
FIG. 11 is a transmission electron micrograph of monodisperse particles of carbon-coated vanadium sodium phosphate composite material prepared in Example 5.

FIG. 11 is a transmission electron micrograph of monodisperse particles of carbon-coated vanadium sodium phosphate composite material prepared in Example 5. It can be seen from FIG. 11 that in this material, vanadium phosphate crystal particles are embedded in a conductive carbon layer. On the one hand, the carbon layer network facilitates the rapid transmission of sodium ions and electrons during battery charging and discharging, and on the other hand, it facilitates the limitation of the volume expansion of the vanadium sodium crystal particles.

The positive electrode materials prepared in Example 4 and Comparative Example 2 were tested for electrochemical performance. Electrode production and battery assembly are as follows: The carbon-coated vanadium sodium phosphate composite positive electrode material prepared in Example 1, conductive carbon black, and binder PVDF were weighed at a mass ratio of 8:1:1; and then added with an appropriate amount of 1-methyl-2 pyrrolidone (NMP), mixed thoroughly and grinded homogeneously, then coated on aluminum foil, and dried in a vacuum drying oven at 120° C. for 12 hours, and then punched into discs with 14 mm diameter after cooling. In an argon atmosphere glove box, a CR2016 button cell was assembled with metallic sodium as the negative electrode, the microporous polypropylene membrane as the diaphragm, and the 1MNaPF6/EC+EMC+FEC (1:1:0.02) solution as the electrolyte. The battery tests were all carried out on the LAND battery test system, with a test temperature of 25° C.

In the voltage range of 2.0V-4.0V, the battery was charged and discharged.

Figure 12:
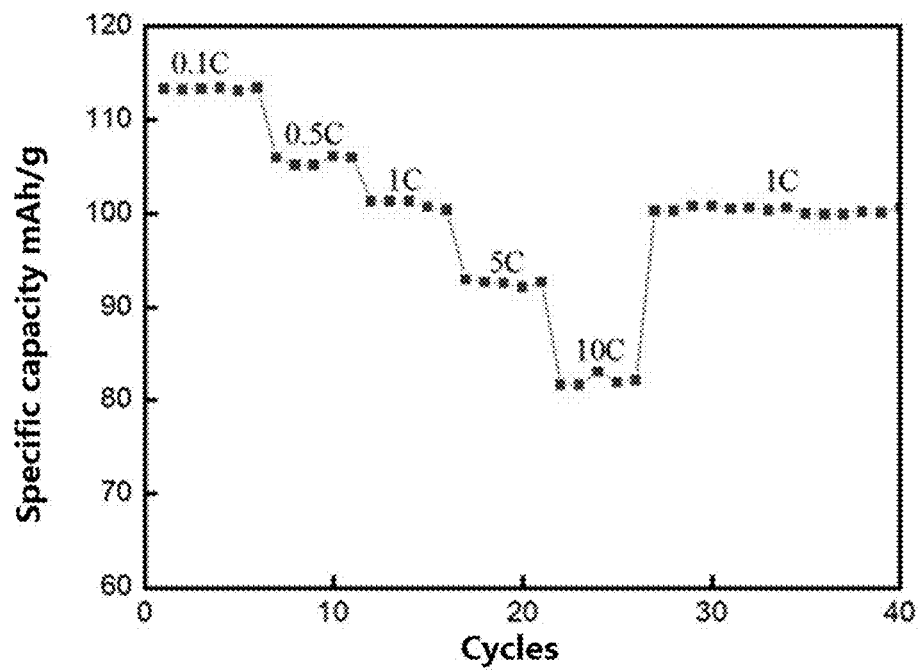
FIG. 12 is a summary diagram of charge and discharge performance of the carbon-coated vanadium sodium phosphate composite positive electrode material prepared in Example 4 at a current density of 11.8 mA/g-1180 mA/g.

FIG. 12 is a summary diagram of the charge and discharge of the carbon-coated vanadium sodium phosphate composite positive electrode material prepared in Example 4 at a current density of 11.8 mA/g-1180 mA/g, showing that the carbon-coated vanadium sodium phosphate composite material prepared under the best conditions in the present disclosure has the best capacity expression and rate cycling performance as of the positive electrode of a sodium ion battery. The capacity density can reach 113 mAh/g at 0.1 C charge-discharge rate, the capacity density can reach 105 mAh/g at 0.5 C charge-discharge rate. In addition, the rate capacity density can reach 82 mAh/g at 10 C charge-discharge rate, the rate capacity density can reach 101 mAh/g at 1 C charge-discharge rate, and the rate capacity density can reach 92 mAh/g at 5 C charge-discharge rate. After 10 cycles of high-rate cycles, the positive electrode material can still reach 101 mAh/g at 1 C charge-discharge rate.

The button batteries with carbon-coated vanadium sodium phosphate composite positive electrode material prepared in Example 5 and Comparative Example 2 were made according to the method described above.

Figure 13:
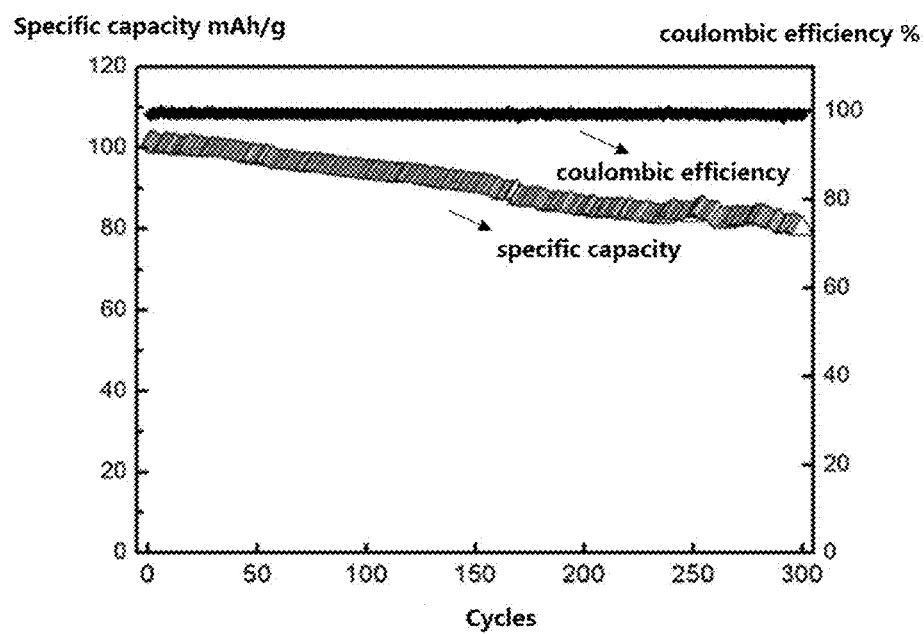
FIG. 13 is a charge-discharge cycle diagram of the carbon-coated vanadium sodium phosphate composite positive electrode material prepared in Example 5 at a current density of 118 mA/g.

FIG. 13 is a charge-discharge cycle diagram of the carbon-coated vanadium sodium phosphate composite positive electrode material prepared in Example 5 at a current density of 118 mA/g. It can be seen from FIG. 13 that after 100 cycles, the battery capacity retention rate is 94%, and the coulombic efficiency is 99.7%; after 200 cycles, the battery capacity retention rate is 91 and the coulombic efficiency is 99.5%; after 300 cycles, the battery capacity retention rate is 80%, and the coulombic efficiency is 99.5%.

Figure 14:
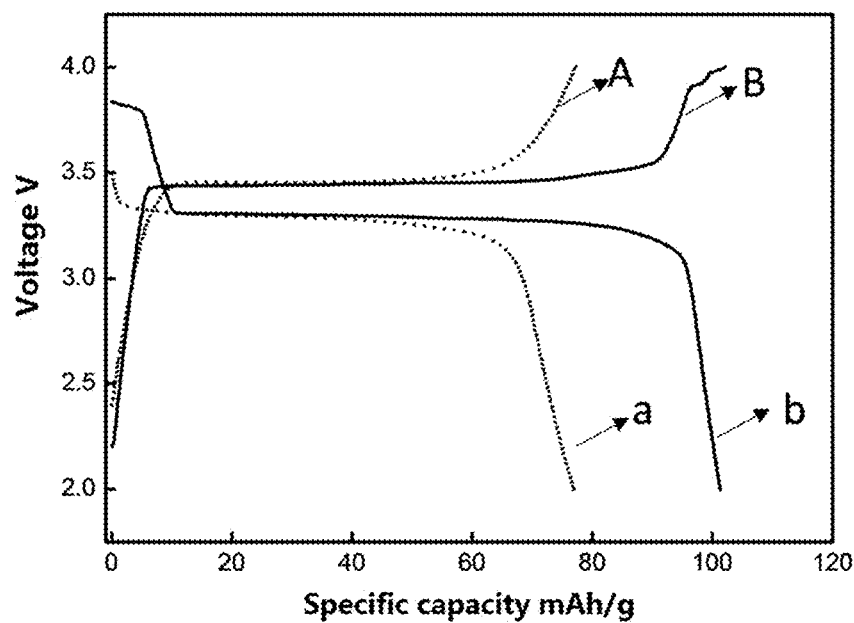
FIG. 14 is a graph showing the charge and discharge curves of the carbon-coated vanadium sodium phosphate composite positive electrode material prepared in Example 4 and Comparative Example 2 tested at a current density of 117 mA/g, wherein A and a are respectively the charge and discharge curves of the carbon-coated vanadium sodium phosphate composite positive electrode material prepared in the Comparative Example; B and b are respectively the charge and discharge curves of the carbon-coated vanadium sodium phosphate composite positive electrode material prepared in Example 4.

FIG. 14 is a graph showing the charge and discharge test curves of the carbon-coated vanadium sodium phosphate composite positive electrode material prepared in Example 4 and Comparative Example 2 at a current density of 117 mA/g, wherein, A and a are respectively the charge and discharge curves of the carbon-coated vanadium sodium phosphate composite positive electrode material prepared in the Comparative Example; B and b are respectively the charge and discharge curves of the carbon-coated vanadium sodium phosphate composite positive electrode material prepared in Example 4. It can be seen from FIG. 14 that the carbon-coated vanadium sodium phosphate composite positive electrode material prepared in Comparative Example 2 has a capacity of only 77 mAh/g at the rate of 1 C. This is because the addition sequence of ammonium dihydrogen phosphate and sodium carbonate was changed in the Comparative Example, so that the metavanadate ions were not highly polymerized in the solution stage, and the crystallinity and the electrochemical performance are poor after low-temperature calcination.

Figure 15:
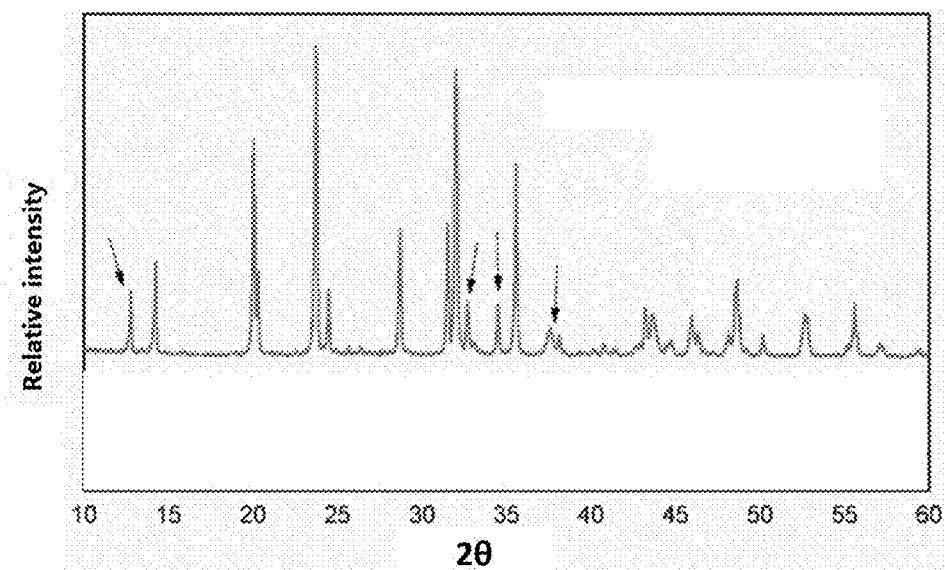
FIG. 15 is an X-ray diffraction pattern of the carbon-coated vanadium sodium phosphate composite positive electrode material prepared in Comparative Example 2, wherein the arrows indicate the impurity peaks.

FIG. 15 is an X-ray diffraction pattern of the carbon-coated vanadium sodium phosphate composite positive electrode material prepared in Comparative Example 2, in which the arrows indicate the impurity peaks. During the preparation process of the product of Comparative Example 2, due to the significant change in the addition sequence of the raw materials, it can be seen from the XRD pattern that the material has some obvious impurity peaks, and as mentioned above, the capacity of the product of Comparative Example 2 at 1 C rate is only 77 mAh/g.

At room temperature, the material prepared in Example 6 was used as the positive electrode material for sodium ion battery, and the metallic sodium was used as the counter electrode. In the range of 2.0V-4.0V, the charge-discharge capacity at 117 mA/g is 83 mAh/g, which is somewhat lower than that in Example 4 (113 mA/g), indicating that when the carbon content is too high, the carbon layer is too thick to hinder the migration of sodium ions (or when it is too low, the material has poor electronic conductivity), which is not conducive to the expression of the electrochemical performance of the material.

For the convenience of comparison, the measured data of Examples 4-6 and Comparative Examples are listed in Table 1, as shown below.

TABLE 1

| | First-cycle discharge capacity (mAh/g) | First-cycle coulombic efficiency of charge and discharge (%) |
| --- | --- | --- |
| Example 4 | 113 | 99.7 |
| Example 5 | 112 | 99.4 |
| Example 6 | 83 | 98 |
| Comparative Example 2 | 77 | 95 |

Although specific embodiments of the present disclosure are described above, those skilled in the art should understand that these are merely illustrative examples, and various changes or modifications can be made to these embodiments without departing from the principle and essence of the present disclosure. Therefore, the protection scope of the present disclosure is defined by the appended claims.

What is claimed is:

1. A method for preparing a vanadium sodium phosphate positive electrode material, which comprises the following steps:
   (1) performing a reaction in which an aqueous solution containing a vanadium source reacts with a phosphorus source, a reducing agent, a sodium source, and a carbon source; wherein the reaction comprises: the aqueous solution containing the vanadium source reacting first with the phosphorus source, and then with the reducing agent; or, the aqueous solution containing the vanadium source reacting first with the reducing agent and then with the phosphorus source;
   (2) obtaining a reaction solution from step (1), drying and calcining the reaction solution.

2. The method for preparing the vanadium sodium phosphate positive electrode material according to claim 1, wherein,
   the vanadium source comprises one or more of vanadium pentoxide, ammonium metavanadate, vanadium acetylacetonate and vanadyl acetylacetonate;
   or, the phosphorus source comprises one or more of phosphoric acid, sodium dihydrogen phosphate, diammonium hydrogen phosphate and ammonium dihydrogen phosphate; when the phosphorus source contains sodium atoms, the phosphorus source and the sodium source are the same substance;
   or, the reducing agent is a reducing sugar or a reducing acid; when the reducing agent is a reducing sugar, the reducing agent and the carbon source are the same substance; the reducing sugar refers to sugars that generate carbon dioxide under the condition of calcination at 400 to 450° C.

3. A method for preparing a vanadium sodium phosphate nanosheet, which comprises the following steps:
   S1, dissolving a vanadium source and a reducing acid in deionized water for performing a reaction to obtain reaction solution 1;
   S2, adding a sodium source, a phosphorus source and a carbon source to the reaction solution 1 for performing a reaction to obtain reaction solution 2;
   S3, reacting the reaction solution 2 with ethylene glycol to obtain reaction solution 3;
   S4, mixing the reaction solution 3 with polyol to obtain a precursor mixture solution through a Ostwald ripening process;
   S5, centrifuging the precursor mixture solution to obtain the precursor, and then drying to obtain a dried precursor;
   S6, pre-calcining the dried precursor at 350-500° C. for 4 hours in a reducing gas atmosphere, then calcining at a high temperature of 600-700° C. for 7-12 hours, and cooling to room temperature to obtain a vanadium sodium phosphate composite material as a vanadium sodium phosphate nanosheet.

4. The method for preparing the vanadium sodium phosphate nanosheet according to claim 3, wherein, a molar ratio of vanadium in the vanadium source to the reducing acid described in S1 is 2:3;
   or, the reaction solution 1 described in S1 has a molar concentration of vanadium of 0.2 mol/L;
   or, the vanadium source described in S1 is one or more of vanadium pentoxide, ammonium metavanadate, vanadium acetylacetonate and vanadyl acetylacetonate;

or, the reducing acid described in S1 is one or more of oxalic acid dihydrate, citric acid monohydrate and anhydrous citric acid;

or, the reaction described in S1 is carried out at 50-80° C. for 2 to 4 hours.

5. The method for preparing the vanadium sodium phosphate nanosheet according to claim 3, wherein, the sodium source and the phosphorus source described in S2 are added in a molar ratio of Na:V:P=(3~3.04):2:(3~3.04);

or, the carbon source described in S2 has an addition amount of 0.49~9.82 times the mass of vanadium;

or, the sodium source described in S2 is one or more of sodium carbonate, sodium dihydrogen phosphate dihydrate, anhydrous sodium dihydrogen phosphate, and sodium acetate;

or, the phosphorus source described in S2 is one or more of phosphoric acid, sodium dihydrogen phosphate dihydrate and anhydrous sodium dihydrogen phosphate;

or, the carbon source described in S2 is one or more of glucose, sucrose and dopamine;

or, the reaction described in S2 is carried out for a period of 0.5~1 h.

6. The method for preparing the vanadium sodium phosphate nanosheet according to claim 3, wherein, the ethylene glycol and water contained in the reaction solution 2 described in S3 has a volume ratio of 0.5:1 to 10:1;

or, the reaction described in S3 is carried out for 20-60 minutes;

or, the polyol described in S4 is n-propanol or isopropanol;

or, the polyol and water contained in the reaction solution 3 described in S4 are presented at a volume ratio of 2.5:1 to 5:1;

or, the polyol described in S4 has an addition rate of 2 to 4 mL/min;

or, the drying described in S5 is carried out by any one of the following methods: blast drying at 25-50° C. for 6-12 hours, vacuum drying at 25-50° C. for 6-12 hours, and freeze drying for 10 to 48 hours;

or, S6 is performed in a tube furnace at a heating rate of s 2-10° C./min;

or, the reducing gas described in S6 is a H2/Ar mixed gas, wherein H2 has a volume percentage of 5%-10%.

7. A vanadium sodium phosphate nanosheet prepared by the method according to claim 3.

8. The vanadium sodium phosphate nanosheet according to claim 7, wherein the vanadium sodium phosphate nanosheet has a length and width of 100-150 nm, and a thickness of about 20-30 nm.

9. A sodium ion battery employing the vanadium sodium phosphate nanosheet of claim 7 as a positive electrode material, and metallic sodium as a negative electrode.

10. A use of the vanadium sodium phosphate nanosheet according to claim 7 in a sodium ion battery.

11. A method for preparing a carbon-coated vanadium sodium phosphate composite positive electrode material, which comprises the following steps:
i) carrying out a mixing reaction between an aqueous solution containing a vanadium source and a phosphorus source to obtain reaction solution A, and the mixing reaction is carried out at a pH of 4-7;
ii) carrying out a mixing reaction between the reaction solution A and a reducing sugar to obtain reaction solution C when the phosphorus source also contains sodium atoms;

carrying out a mixing reaction between the reaction solution A and a sodium source to obtain a reaction solution B when the phosphorus source does not contain sodium atoms, and then carrying out a mixing reaction between the reaction solution B and a reducing sugar to obtain a reaction solution C;
iii) spray drying and calcining the reaction solution C.

12. The method for preparing the carbon-coated vanadium sodium phosphate composite positive electrode material according to claim 11, wherein,
in step i) the vanadium source is an ammonium metavanadate or a vanadium pentoxide;

or, in step i), the aqueous solution containing the vanadium source is prepared by the following steps: dissolving the vanadium source in water and heating to complete dissolution;

or, in step i), the vanadium source in the aqueous solution containing the vanadium source has a concentration of 0.1 mol/L to 0.5 mol/L;

or, in step i), the phosphorus source is one or more of phosphoric acid, sodium dihydrogen phosphate, diammonium hydrogen phosphate, and ammonium dihydrogen phosphate;

or, in step i), the mixing reaction is carried out at a temperature of 88-95° C.;

or, in step i), the mixing reaction is carried out for a period of 8-12 minutes;

or, in step i), the mixing reaction is carried out at a pH of 5-6.

13. The method for preparing the carbon-coated vanadium sodium phosphate composite positive electrode material according to claim 11, wherein,
in step ii), the reducing sugar refers to sugars that generate carbon dioxide under the condition of calcination at 400-450° C.;

or, in step ii), the reducing sugar has an amount as follows: carbon after carbonization of the reducing sugar accounts for 3%-20% of the total mass of the carbon-coated vanadium sodium phosphate composite positive electrode material.

14. The method for preparing the carbon-coated vanadium sodium phosphate composite positive electrode material according to claim 11, wherein,
in step ii), the mixing reaction between the reaction solution A and the reducing sugar is carried out at a temperature of 85-95° C.;

or, in step ii), the mixing reaction between the reaction solution A and the reducing sugar is carried out for a period of 40 min-2 h;

or, in step ii), the mixing reaction between the reaction solution B and the reducing sugar is carried out at a temperature of 85-95° C.;

or, in step ii), the mixing reaction between the reaction solution B and the reducing sugar is carried out for a period of 40 min-2 h.

15. The method for preparing the carbon-coated vanadium sodium phosphate composite positive electrode material according to claim 11, wherein,
in step ii), the sodium source is one or more of sodium carbonate, sodium dihydrogen phosphate, sodium oxalate, sodium citrate and sodium bicarbonate;

or, in step ii), the mixing reaction between the reaction solution A and the sodium source is carried out at a temperature of 88-95° C.;

or, in step ii), the mixing reaction between the reaction solution A and the sodium source is carried out for a period of 8-12 min;

or, in step ii), the mixing reaction between the reaction solution A and the sodium source is carried out at a pH of 6-9.

16. The method for preparing the carbon-coated vanadium sodium phosphate composite positive electrode material according to claim 11, wherein, in step iii), in the reaction solution C, vanadium ions have a concentration of is 0.1-0.5 mol/L;

or, in step iii), the spray drying is carried out under the conditions as follows: inlet temperature is 180-200° C., gas flow rate is 660-1000 L/h, and feed pump flow rate is 200-900 mL/h;

or, in step iii), the calcining is carried out at a temperature of 400-600° C.;

or, in step iii), the calcining is carried out for a period of 6-15 h.

17. A carbon-coated vanadium sodium phosphate composite positive electrode material prepared by the method according to claim 11.

18. The carbon-coated vanadium sodium phosphate composite positive electrode material according to claim 17, wherein, the carbon-coated vanadium sodium phosphate composite positive electrode material has a particle size of 2 μm to 5 μm; in the carbon-coated vanadium sodium phosphate composite positive electrode material, carbon coating layer has a thickness of 6 nm to 15 nm.

19. A sodium ion battery employing the carbon-coated vanadium sodium phosphate composite positive electrode material according to claim 17 as a positive electrode material, and metallic sodium as a negative electrode.

20. A use of the carbon-coated vanadium sodium phosphate composite positive electrode material according to claim 17 in a sodium ion battery.

* * * * *